United States Patent
Aron

[15] 3,650,101
[45] Mar. 21, 1972

[54] HAY-MAKING MACHINE
[72] Inventor: Jerome Aron, Dossenheim/Zinsel, France
[73] Assignee: Kuhn Freres & Cie, Societe en commandite simple, Saverne (Bas-Rhin), France
[22] Filed: Apr. 10, 1970
[21] Appl. No.: 27,260

[30] Foreign Application Priority Data
Apr. 16, 1969 Switzerland ............................5755/69

[52] U.S. Cl. ...............................................................56/370
[51] Int. Cl. ........................................................A01d 79/02
[58] Field of Search ..................................56/370, 365–369, 56/371

[56] References Cited
FOREIGN PATENTS OR APPLICATIONS
458,823 8/1968 Switzerland ............................56/370
450,793 4/1968 Switzerland ............................56/370
458,822 8/1968 Switzerland ............................56/370

Primary Examiner—Robert Peshock
Assistant Examiner—J. N. Eskovitz
Attorney—Young & Thompson

[57] ABSTRACT

A hay-making machine adapted to be attached to and driven by power take-off from a conventional agricultural tractor, and the hay-making machine has at least one rake wheel driven in rotation about a vertical axis, in which rake prongs are controlled by crank arms, connected with prong carriers, on a control track in a section of the rotating movement of the rake wheel in a pivoting movement directed from the ground upwards and contrarily to the direction of rotation of the rake wheel, characterised in that in the case of an even number of radially arranged prong carriers each two mutually diametrically opposed prong carriers have a fixed connection with one another and are controlled commonly by at least one crank arm.

5 Claims, 4 Drawing Figures

HAY-MAKING MACHINE

INTRODUCTION AND BACKGROUND OF THE INVENTION

The invention relates to a hay-making machine having at least one rake wheel driven in rotation about a vertical axis, wherein rake prongs are controlled by crank arms connected with prong carriers on a control track in a section of the rotating movement of the rake wheel in a pivoting movement directed from the ground upwards contrarily to the direction of rotation of the rake wheel.

In such hay-making machines hitherto each individual prong carrier was separately controlled by an associated crank arm on the control track.

The invention has the purpose of a simplification of the control apparatus of the rake wheel or wheels of a hay-making machine of this kind.

BRIEF SUMMARY OF THE INVENTION

This aim is achieved with the invention due to the fact that, with an even number of radially arranged prong carriers, each two diametrically mutually opposed prong carriers have a fixed connection with one another and are controlled commonly by at least one crank arm.

FURTHER DESCRIPTION AND ADVANTAGES OF THE INVENTION

Hay-making machines have already become known in which the crank arms are either guided in a double-walled control track or are also held in force-engaging manner by means of spring force on a unilaterally acting control track.

According to a preferred form of embodiment of the invention it is possible to dispense with the double-walled construction of the control track and with the springs for the prong carriers, due to the fact that with each two prong carriers two crank arms are connected fast in rotation, which arms, seen in plan view, lie on opposite sides of an axis of rotation of the prong carriers, and control rollers of the two crank arms have a positive shape-locking connection on the control track during the full rotating movement of the rake wheel.

BRIEF DESCRIPTION OF THE VIEWS IN THE DRAWINGS

The invention will be explained in greater detail hereinafter by reference to an example of embodiment which is illustrated in the accompanying drawings, wherein:

FIG. 1 shows a vertical section through a rake wheel of a hay-making machine, in which for the sake of clarity only the control system for two prong carriers is represented, FIG. 2 shows the control elements of all prong carriers in plan view and on a larger scale, FIG. 3 shows a diagrammatic representation of the control regions of the control track in plan view, and FIG. 4 shows the diagrammatic development of the control track in elevation.

DETAILED DESCRIPTION OF THE PREFERRED EMBODIMENTS

Figure 1:
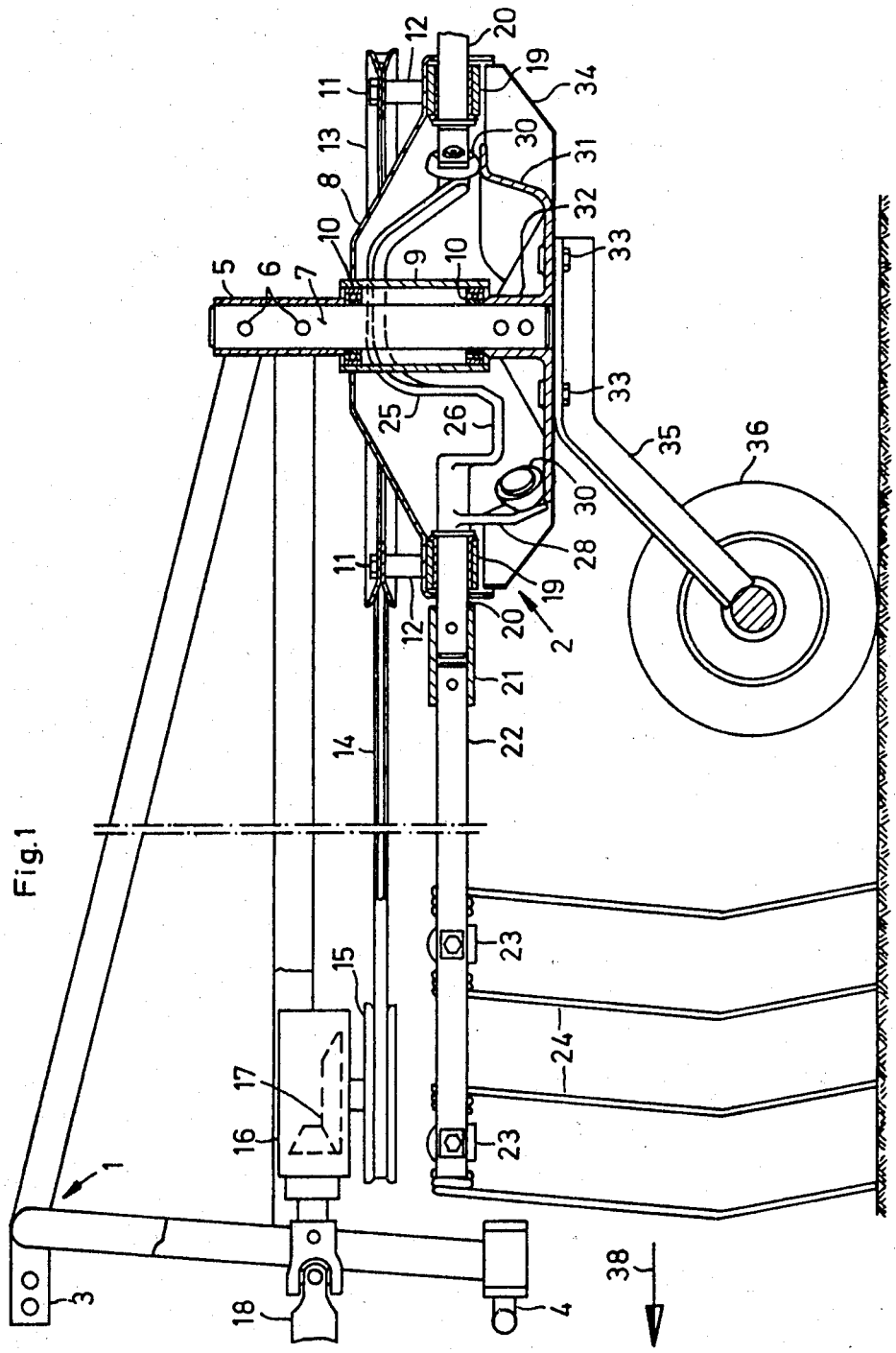

As may be seen from FIG. 1, the hay-making machine, consisting of a rake wheel 2, is couplable with a three-point attachment frame 1 at an upper attachment point 3 and at two lower attachment points 4 lying side by side in a horizontal plane to the conventional three-point attachment linkage of an agricultural tractor. The three-point attachment frame 1 carries at its rear end a vertical tube 5 in which an upright spindle 7 is anchored with bolts 6. A rotor disc 8 is rotatably mounted on the upright spindle 7 with a hub 9 by means of two ball bearings 10.

A V-belt pulley 13 screwed fast with screws 11 to carrier bolts 12 is connected fast in rotation with the rotor disc 8. The V-belt pulley 13 is in drive connection through a V-belt 14 with a smaller V-belt pulley 15 which is driven by a Cardan shaft 18 through an angle drive system 17 accommodated in a gear box 16. This Cardan shaft 18 is in turn in drive connection with the power takeoff shaft of the tractor.

Bearing shafts 20, with each of which a prong carrier 22 is connected fast in rotation by means of a connection sleeve 21, are rotatably mounted in bearing bushes 19 of the rotor disc 8 which are directed radially of the vertical spindle 7. Of these prong carriers 22, extending radially outwards from the rotor disc 8, only one is illustrated in shortened manner in FIG. 1. On the free ends of the prong carriers 22, rake prongs 24 are secured with screw connections 23, which prongs are in contact with the ground in the rake position as illustrated.

Figure 2:
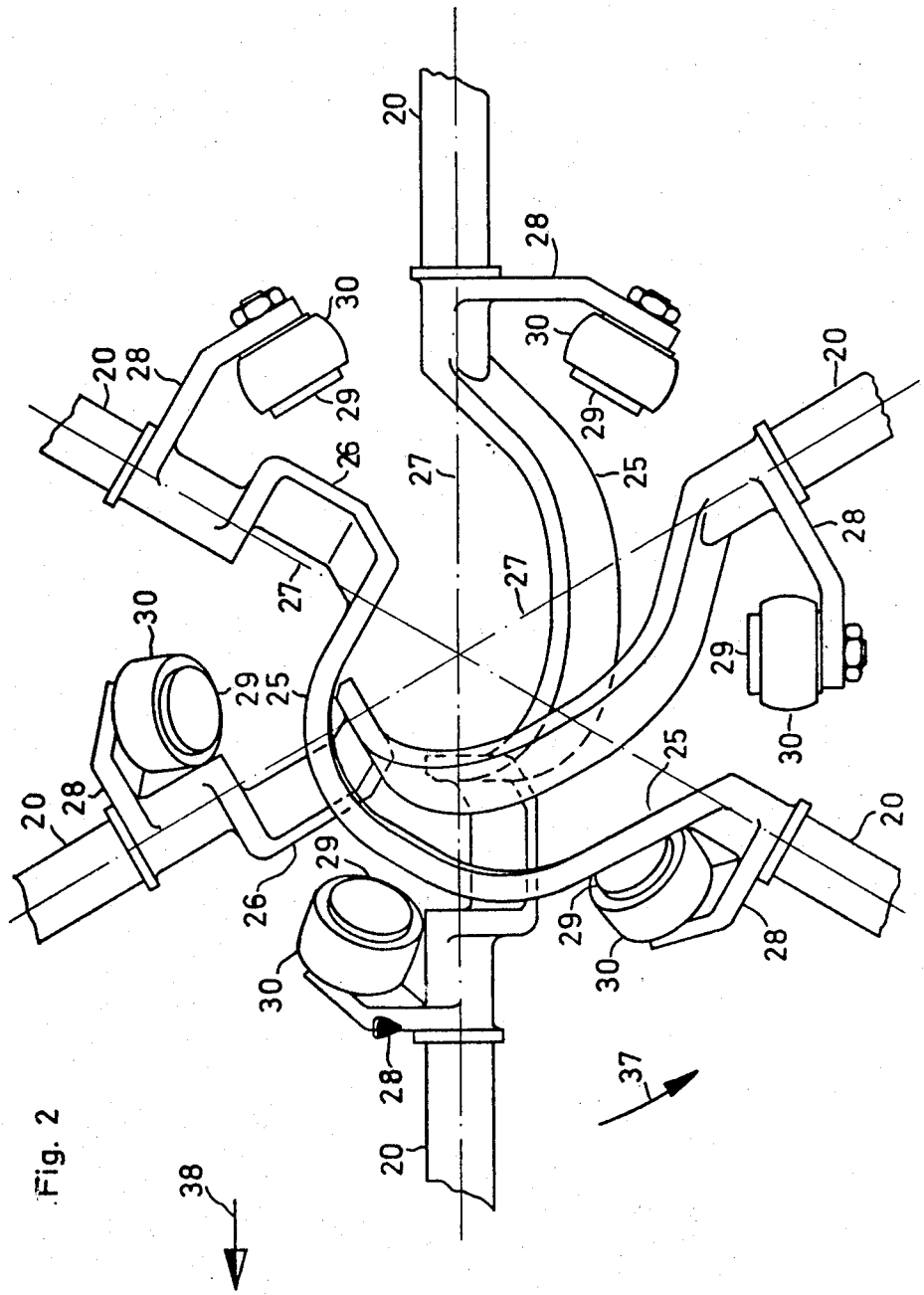

As may be seen especially from FIG. 2, each two mutually diametrically opposite bearing shafts 20 form one fixed element with an arcuate connection web 25, these connection webs 25 having a U-shaped crank portion 26 on one side. Of the six prong carriers 22, two in each case are rigidly connected with one another with these connection webs 25 which extend around the hub 9 of the rotor disc 8, and are rotatable in pairs in the bearing bushes 19 about a rotation axis 27. The space conditions within the rotor disc 8 necessitate some of the connecting webs 25 crossing one another in the region of the crank portions 26.

Crank arms 28, which considered in the plan view according to FIG. 2 lie on opposite sides of the rotation axis 27 and are downwardly inclined are fitted on the bearing shafts 20 of the prong carriers 22. Control rollers 30 are freely rotatably mounted on the crank arms 28 with bearing bolts 29. These control rollers run on a control track 31 which is secured by sleeve 32 on the lower end of the vertical spindle 7. A covering 34 which extends with its edge as far as the rotor disc 8 and forms a housing closed on all sides therewith is anchored on the control track 31 with screws 33. With the screws 33 a carrier arm 35 is also screwed fast on the control track 31. The rake wheel can be supported on the ground in the working position by a support wheel 36 rotatably mounted on this carrier arm 35.

Figure 3:
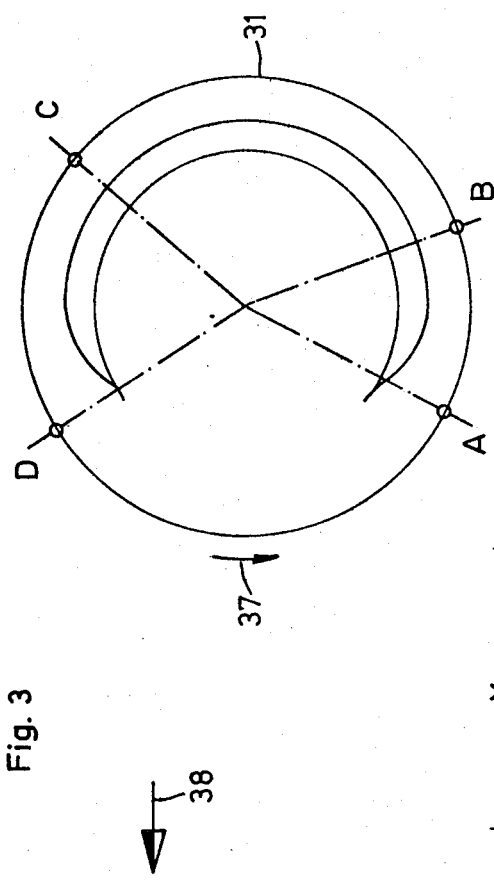
Figure 4:
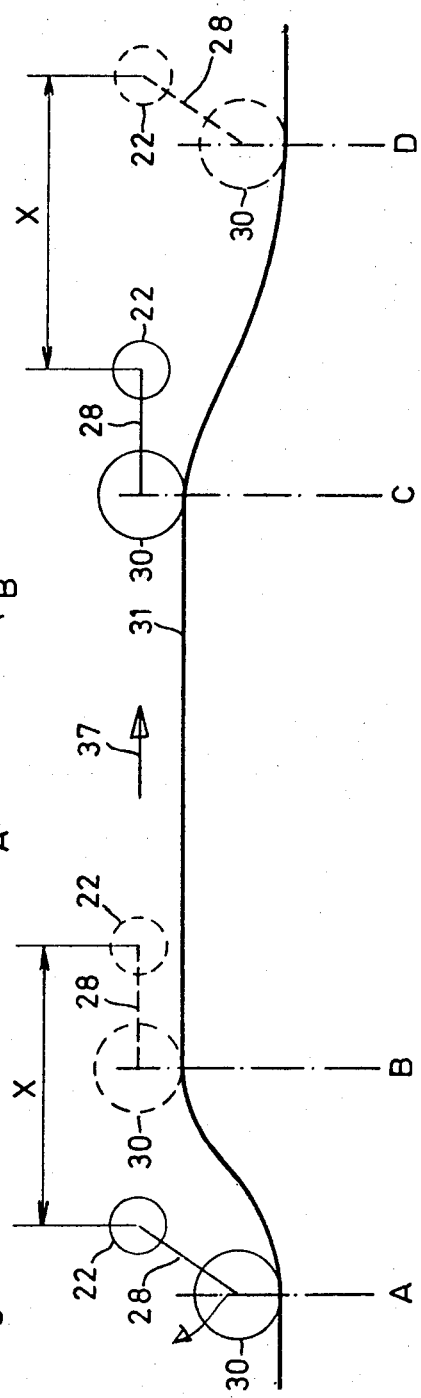

The formation of the control track 31 and its controlling influence upon the prong carriers 22 and their rake prongs 24 may be seen from FIGS. 3 and 4. The circular control track 31 has a flat control region D–A and a similarly flat control region B–C placed higher than the control region D–A but extending in a parallel horizontal plane. Considered in the direction of rotation of the rake wheel 2 as indicated by the direction arrow 37, the control region D–A is followed by a rising curve A–B and the higher control region D–C is followed by a descending curve C–D. The control region D–A, as shown by FIG. 3, lies in the forward region of the rake wheel 2 considered in the direction of travel as indicated by the arrow 38. The prong carriers 22 situated in this control region D–A during the rotating movement of the rake wheel 2 are in the rake position, in which the associated rake prongs 24 have ground contact, being directed approximately vertically towards the ground.

On the left side of FIG. 4 the control roller 30 of a prong carrier 22 is at the end of the control region D–A and will thereafter travel over the rising curve A–B, travelling over the section X, and finally at the beginning of the control region B–C will reach the position shown in chain lines. In this movement the crank arm 28, with a pivoting movement directed in the clockwise direction, has rotated the prong carrier and moved the associated rake prongs 24 out of raking position to a horizontal position lifted away from the ground. The control movement of the prong carrier 22 lying diametrically opposite to this prong carrier 22 and connected fast in rotation therewith through the connecting web 25 is represented on the right side of the control track 31. When the prong carrier 22 shown on the left has reached the end of the control region D–A, the prong carrier 22 illustrated on the right is at the end of the control region B–C, during which the rake prongs 24 were raised out of raking position. Since the crank arm 28 of this prong carrier 22 lies on the opposite side of the rotation spindle 27, in travelling the distance X on the descending curve C-D this arm makes a contrarily equal pivoting movement in the counterclockwise direction and on reaching the position shown in chain lines at the beginning of the control region D-A brings the prong carrier 22 with the associated rake prongs 24 into the rake position. The contrarily equal control movement of two mutually coupled prong carriers 22 is thus such that at the same time and in alternation the rake prongs 24 of one prong carrier 22 are moved in the control region D-A into the rake position and the rake prongs 24 of the other prong carrier 22 are raised in the control region B-C out of raking action, while the prong carriers 22 on the distance X travel through the curves A-B and C-D likewise simultaneously and alternately.

Due to the contact between the control rollers 30 and the control track 31, which is maintained during the full rotating movement of the rake wheel 2, each two mutually connected prong carriers 22 are held in the constrained rotational position, predetermined by the control track 31, by means of the two crank arms 28 lying on opposite sides in relation to the rotation spindle 27, with which position the positioning of the rake prongs 24 is effected. With the simultaneous pivoting movement, taking place contrarily and equally about the rotation spindle 27, of the two crank arms 28 allocated to two prong carriers 22 each, in the case of the left crank arm 28 the shifting of the control roller 30 is directed oppositely in the horizontal direction to the direction of rotation 37, while in the case of the right control roller 30 this shift in the horizontal direction is directed with the rotating movement. This unequal movement ratio has for the maintenance of a constant contact of the control rollers 30 on the control track 31 the prerequisite that the curve course and the curve length of the two curves D-A and C-D are unequal as shown by FIG. 4.

In the direction of rotation of the rake wheel 2 as indicated by the direction arrow 37 the control rollers 30 with the crank arms 28 directed obliquely to the rear in relation to the direction of rotation follow the prong carriers 22.

The rake wheel can also be driven in rotation in the opposite direction of rotation, in which case the control rollers 30 would be pushed and lead the prong carriers 22. Thus for example in the case of a hay-making machine equipped with two oppositely rotating rake wheels, the rake wheels could be formed with similar control elements.

For driving the hay-making machine on the road it would be expedient if all prong carriers could be simultaneously rotated in such a way that all rake prongs are situated in the raised nonoperational position and thus ensure a desired ground clearance. For this purpose means (not shown) can be provided to actuate all prong carriers in common with similar rotation so that all rake prongs are lifted away from the ground with the same pivoting distance.

What is claimed is:

1. A hay-making machine comprising a plurality of outwardly extending arms having rake tines thereon, means to rotate the arms about a vertical axis, said arms being fixedly secured together in only diametrically opposed pairs by a connecting portion, a cam track for swinging said arms thereby to raise and lower said tines to impart to said tines a raking movement, and at least one crank arm secured to each diametrically opposed pair of arms and having cam follower means on said crank arm riding on said cam track to move each diametrically opposed pair of arms as a unit.

2. A hay-making machine as claimed in claim 1, said cam follower means comprising a wheel.

3. A hay-making machine as claimed in claim 1, said cam follower means comprising a pair of wheels on a pair of crank arms on opposite sides of said axis.

4. A hay-making machine as claimed in claim 1, and a vertical spindle coaxial with said vertical axis, each said diametrically opposed pair of arms having a connecting portion that passes about said spindle.

5. A hay-making machine as claimed in claim 1, and coaxial bearing means for rotatably supporting said pair of opposed pair of arms on opposite sides of said axis.

* * * * *